(No Model.)
W. A. ARMSTRONG.
PLOW.
No. 530,061. Patented Nov. 27, 1894.
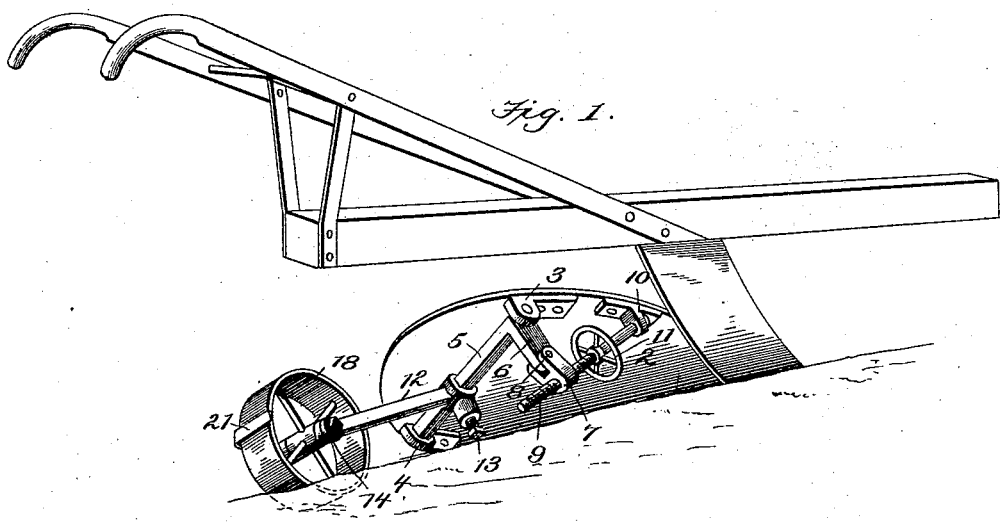
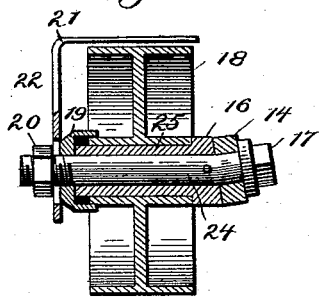
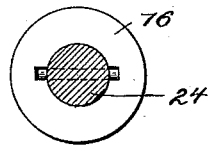
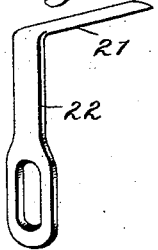
Witnesses
Edwin L Bradford
Ralph Wormelle
Inventor
William Albert Armstrong
By Patrick O'Farrell
Attorney

UNITED STATES PATENT OFFICE.

WILLIAM ALBERT ARMSTRONG, OF ELKTON, OHIO, ASSIGNOR OF ONE-HALF TO ORLAN DICKEY, OF SAME PLACE.

PLOW.

SPECIFICATION forming part of Letters Patent No. 530,061, dated November 27, 1894.

Application filed April 9, 1894. Serial No. 506,860. (No model.)

*To all whom it may concern:*

Be it known that I, WILLIAM ALBERT ARMSTRONG, a citizen of the United States of America, residing at Elkton, in the county of Columbiana and State of Ohio, have invented certain new and useful Improvements in Plows, of which the following is a specification, reference being had therein to the accompanying drawings.

This invention relates to plows; and aims to lighten the draft, prevent loose earth, sod and trash from falling in the furrow immediately in the rear of the plow thereby obviating the necessity of two or more harrowings of the ground to get the same in proper condition.

The improvement consists of a furrow wheel in combination with the plow and means of adjusting the relative position thereof to any elevation.

The improvement also consists of a rock shaft journaled in suitable bearings on the mold-board, means for turning the said shaft in its bearings, an arm adjustable on the rock-shaft, and a furrow wheel and scraper mounted on a spindle carried by the said arm.

The improvement consists of the novel features and the peculiar construction and combination of the parts which will hereinafter be more fully described in the accompanying drawings, in which—

Figure 1— is a rear perspective view of a plow embodying the invention. Fig. 2— is a detail view of the spindle on which the furrow wheel is mounted. Fig. 3— is a detail view showing the cam faced washers by means of which the spindle is set to the proper angle relative to its supporting arm. Fig. 4— is a detail view showing the means of adjustably attaching the scraper to the spindle.

Referring to the drawings the numeral 2, represents a mold board of a plow having the usual shape and provided on the inner face with two bearing blocks 3 and 4. A rock shaft 5 is journaled at its ends in the bearings 3 and 4 and has an arm to project at right angles therefrom. A nut 7 provided with extensions or ears to receive the end of the arm 6 is pivotally connected thereto by a pin or bolt 8. An adjusting shaft 9, threaded at one end to screw into the nut 7, obtains a bearing at the opposite end in a bracket 10, secured on the inner face of the mold-board. This adjusting shaft 9, is free to rotate in the bracket 10, and have a limited lateral movement but is held securely from any longitudinal movement, and is rotated in any manner, preferably by a hand wheel 11. The arm is adjustable on the rock shaft 5, being held thereon at the desired position by a binding screw 13, and terminates in an eye 14, which receives the end of the spindle 15, that is held between a washer 16, and a nut 17. The washer is inclined or cam faced on the side opposite the arm and is designed to be turned on the spindle to secure the desired inclination of the latter relative to the arm.

The furrow wheel 18, is mounted on the spindle and is held between the washer 16 and the cap washer 19, a nut 20 holding the washer 19, in place. The face of the furrow wheel may have any desired contour between the edges, either straight or curved, and will be sufficiently broad to effect the desired result. The cap washer 19, prevents dirt from gaining access to the wearing surfaces between the furrow wheel hub and the spindle.

The scraper 21, is angle shaped and the arm has an oblong opening at its end to receive the end of the spindle and is held between the cap washer 19 and the nut 20. The scraper can be moved to bring the cutting blade nearer to or farther from the surface of the furrow wheel. The washer has a tubular extension or sleeve on its inner face on which the furrow wheel is mounted and a bolt 24, passing through the sleeve 23, binds the parts together, the washer being notched in its outer face to receive a projection on the side of the bolt by means of which the latter is held in the required position relative to the washer 16, and its tubular extension.

I claim—

1. In a plow the combination with a mold-board, a shaft extending transversely of the moldboard and journaled at its ends in bearings provided near the top and bottom edges of the moldboard, and having an integral arm, a nut pivotally connected with the said arm, and adjusting screws for turning the shaft into its bearings, and an arm adjustable along the said shaft and carrying a furrow wheel at its rear end, substantially as described.

2. The combination with a mold-board, of a rock shaft means for turning the rock shaft on its journals, an arm adjustable on the rock shaft and terminating in an eye, a spindle held in the eye of the arm, a cam faced washer to secure the proper inclination or set of the spindle, and a furrow wheel mounted on the spindle.

3. The combination with a mold-board, of a rock shaft journaled thereto and carrying a furrow wheel, and having an arm, a nut pivotally attached to the arm, and an adjusting shaft held in bearings against longitudinal movement, and having a threaded portion to enter the said nut and provided with a hand wheel, substantially as described and for the purpose specified.

In testimony whereof I affix my signature in presence of two witnesses.

WILLIAM ALBERT ARMSTRONG.

Witnesses:
C. W. FINNEY,
LIZZIE M. FINNEY.